(12) United States Patent
Nishijima

(10) Patent No.: US 9,300,204 B2
(45) Date of Patent: Mar. 29, 2016

(54) SWITCHING POWER SUPPLY

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 160 days.

(21) Appl. No.: 13/962,334

(22) Filed: Aug. 8, 2013

(65) Prior Publication Data

US 2014/0062439 A1 Mar. 6, 2014

(30) Foreign Application Priority Data

Sep. 5, 2012 (JP) ................... 2012-195612

(51) Int. Cl.
*H03K 5/1254* (2006.01)
*H02M 3/156* (2006.01)
*H02M 1/14* (2006.01)
*H02M 3/335* (2006.01)

(52) U.S. Cl.
CPC .............. *H02M 3/156* (2013.01); *H02M 1/143* (2013.01); *H02M 3/33507* (2013.01)

(58) Field of Classification Search
CPC .......... H03K 19/00346; H03K 5/1252; H03K 5/1254; H02M 2001/123; H02M 1/44
USPC ............................... 323/217; 363/39; 327/551
See application file for complete search history.

(56) References Cited

U.S. PATENT DOCUMENTS 3,236,946 A * 2/1966 Hansen ..................... H04N 5/21
                                                                    348/683
5,604,453 A * 2/1997 Pedersen ....................... 327/112
6,118,311 A * 9/2000 Kamiya ............... H03K 17/167
                                                                    327/112
6,856,179 B2 * 2/2005 Kaushik ............... H03K 17/166
                                                                    326/26

FOREIGN PATENT DOCUMENTS

JP        10-126237 H         5/1998
JP        2006-333647 A      12/2006

* cited by examiner

*Primary Examiner* — Gary L Laxton
(74) *Attorney, Agent, or Firm* — Rabin & Berdo, P.C.

(57) ABSTRACT

A switching power supply comprises a noise detecting circuit and a canceling signal generating circuit. The noise detecting circuit detects GND bounce noise developing on a ground line of the control circuit accompanying switching operation of a switching element. The canceling signal generating circuit generates a canceling signal corresponding to the GND bounce noise and in a reversed phase, and adds the canceling signal to the ground line when the noise detecting circuit detects the GND bounce noise. In an embodiment, the canceling signal generating circuit generates a canceling signal based on the current flowing through the switching element. In another embodiment, the canceling signal generating circuit generates a canceling signal of a pulse signal with a pulse height equal to a threshold level for detection determination of the GND bounce noise in the noise detecting circuit.

7 Claims, 8 Drawing Sheets

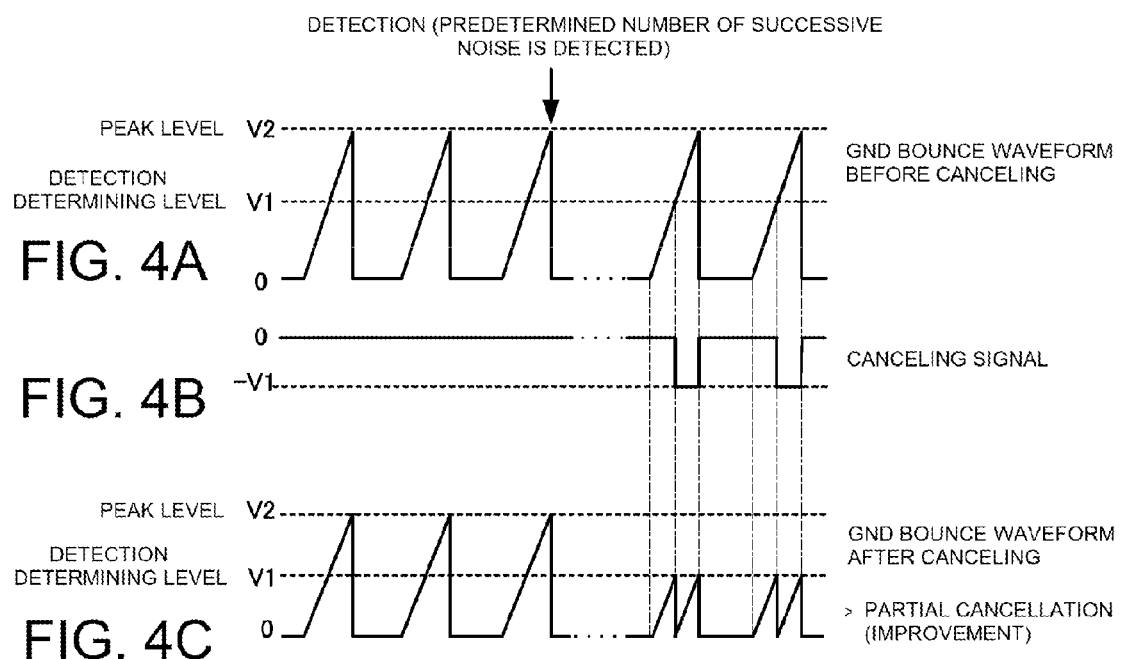

$Zgnd = Rs + jw(Ls+Lpcb)$

SWITCHING POWER SUPPLY

CROSS-REFERENCE TO RELATED APPLICATION

This application is based on, and claims priority to, Japanese Patent Application No. 2012-195612, filed on Sep. 5, 2012, contents of which are incorporated herein by reference.

BACKGROUND OF THE INVENTION

1. Field of the Invention

The present invention relates to a switching power supply that substantially reduces GND bounce noise accompanying switching operation of a switching element.

2. Description of the Related Art

A switching power supply is basically composed of a main body SW of the switching power supply and a control circuit (or a control circuit IC) CONT as shown in FIG. 5A and FIG. 6A, for example. The main body SW of the switching power supply performs switching an input voltage Vin by means of a switching element Q to obtain a predetermined output voltage Vout through an isolating transformer T. The control circuit CONT performs ON/OFF driving operation of the switching element Q at a predetermined frequency. FIG. 5A shows an example of circuit construction to detect switching current in a positive detection mode, and FIG. 6A shows an example of circuit construction to detect switching current in a negative detection mode.

The switching element Q is connected in series to the primary winding P1 of the isolation transformer T and performs switching operation of the input voltage Vin. An alternating voltage is generated across the secondary winding S of the isolation transformer T accompanying the switching operation of the switching element Q and rectified through the diode D, and then smoothed with the output capacitor Cout to be delivered as an output voltage Vout. The symbols Cin in FIG. 5A and FIG. 6A designate input capacitors.

The control circuit CONT operates with a driving power source of the voltage generated across an auxiliary winding P2 of the isolation transformer T and controls the switching operation of the switching element Q according to feedback information from an output voltage detecting circuit (not shown in any figures) for detecting the output voltage Vout. The switching control is conducted by means of PWM control in which the ON width of the ON/OFF driving of the switching element Q at a predetermined frequency or a corresponding period is varied according to the feedback information. The control circuit CONT has an overcurrent protection circuit (not shown in any figure) for the switching element Q in which an overcurrent through the switching element Q is detected with a shunt resistor Rs connected in series to the switching element Q.

The switching power supply having a construction described above generates GND bounce noise synchronous with the switching operation of the switching element Q caused by an impedance component due to a circuit pattern between a grounding point E1 of the main body SW of the switching power supply and a grounding point E2 of the control circuit CONT. The impedance component between the grounding point E1 and the grounding point E2 changes, as shown by the equivalent circuits in FIG. 5B and FIG. 6B, depending on the detection mode, the positive detection mode or the negative detection mode, of the switching current through the shunt resistor Rs. The symbol Lpcb designates an inductance component of the circuit pattern or a wiring pattern, and Rs and Ls designate the resistance component and the inductance component of the shunt resistor Rs, respectively.

FIGS. 7A and 7B show GND bounce noise generated in the positive detection mode and the negative detection mode, respectively. It is apparent that the magnitude of the GND bounce noise is remarkably different between the two detection modes caused by the difference of impedance between the grounding point E1 and the grounding point E2. Paying attention to the noise level synchronous with the switching frequency, which is around 60 kHz, of the switching element Q in particular, the peak level of the GND bounce waveform in the negative detection mode is about 3.5 times of the one in the positive detection mode. In addition, a spectrum of the GND bounce noise, though not shown here, exhibits a difference in peak values as large as 10 dB.

When the switching power supply is subjected to an external noise, for example, an aerial discharge of −15 kV, the output voltage Vout of the switching power supply changes as shown in FIGS. 8A and 8B. In the case of the negative detection mode, the output voltage Vout shows a large bounce from a rated output voltage of 19 V to about 5V. When the external noise that causes such variation in the output voltage Vout is superimposed on the GND bounce noise accompanying the switching operation, a malfunction may occur in the control circuit CONT.

A technique for eliminating the noise generated on the ground line is disclosed, for example, in Patent Document 1 (identified below) in which a noise canceling circuit is provided on an output stage of an LSI and canceling current is delivered to the ground line of the LSI at the moment of transition from an H level to an L level of the output stage. In a technique disclosed in Patent Document 2 (identified below), a common mode current is detected from the input current of an inverter device for driving a three-phase motor and the canceling current that is generated corresponding to the common mode current is fed to the ground line of the inverter device.

[Patent Document 1]

Japanese Unexamined Patent Application Publication No. H10-126237

[Patent Document 2]

Japanese Unexamined Patent Application Publication No. 2006-333647

In the noise canceling technique disclosed in Patent Document 1, the noise canceling circuit generates a canceling current in the reversed phase with respect to the current flowing in the output stage based on the control signal for driving the switching element in the output stage. As a consequence, the noise canceling circuit would necessarily include a switching element having the same characteristic as that of the switching element in the output stage. Thus, the GND bounce noise can hardly be canceled in the switching power supply.

In the noise canceling technique disclosed in Patent Document 2, a canceling current is generated by detecting a common mode current from the input current of the inverter device and the canceling current is obtained from a grounded current in the three-phase motor of the load side.

As a consequence, the inverter device needs to be connected to the outer case of the three-phase motor in the load side. Thus, the overall construction becomes complicated. Moreover, the input terminal of the inverter device needs to be interposed with an inductor and a current transformer for detecting the common mode current, which further complicates the circuit construction.

SUMMARY OF THE INVENTION

The present invention has been made in view of the above-described circumstances and an object of the present invention is to provide a switching power supply that readily reduces GND bounce noise generated accompanying the switching operation of a switching element and improves noise immunity of a control circuit for controlling switching operation of the main body of the switching power supply.

In order to achieve the above object, a switching power supply of the preset invention comprises a main body of the switching power supply that performs switching operation of input voltage through switching a switching element to obtain a specified output voltage, a control circuit that ON/OFF drives the switching element at a predetermined frequency, a noise detecting circuit that detects GND bounce noise developed on a ground line of the control circuit accompanying the switching of the switching element, and a canceling signal generating circuit that generates a canceling signal corresponding to the GND bounce noise and in a reversed phase with respect to the GND bounce noise, and adds the canceling signal onto the ground line of the control circuit when the noise detecting circuit detects the GND bounce noise.

The noise detecting circuit and the canceling signal generating circuit may be installed in the control circuit.

The noise detecting circuit may detect the GND bounce noise from electric potential variation on the ground line synchronous with switching operation of the switching element.

The canceling signal generating circuit may generate the canceling signal based on electric current flowing through the switching element.

Alternatively, the canceling signal generating circuit may generate a canceling signal of a pulse signal with a pulse height equal to a threshold level for determining noise detection of the GND bounce noise in the noise detecting circuit.

In the switching power supply having a construction as stated above, when a GND bounce noise is detected from the ground line of the control circuit, a canceling signal is generated based on the current flowing through the switching element, or a canceling current is formed of a pulse signal having pulse height equal to a threshold level of detecting the GND bounce noise in the noise detecting circuit. As such a canceling signal is given to the ground line, the GND bounce noise is readily and surely canceled or reduced. Even if the control circuit is subjected to an external noise, owing to the reduction in the GND bounce noise itself in the control circuit, malfunctions in the control circuit are rare.

Even in the case of a circuit construction of a negative detection mode of switching current in particular, the impact of the GND bounce noise is controlled to be sufficiently low. Consequently, the GND bounce noise is substantially reduced even in the case of a high impedance between the grounding point of the main body of the switching power supply and the grounding point of the control circuit CONT, which may be caused by a fine wiring pattern employed in order to achieve a small size and low power consumption of the control circuit that is a control IC. Therefore, the signal to noise ratio or noise immunity is enhanced readily and effectively, and malfunctions due to the GND bounce noise are reliably avoided.

BRIEF DESCRIPTION OF THE DRAWINGS

FIGS. 4A, 4B, and 4C are signal waveforms showing canceling operation of GND bounce noise in a switching power supply according to another embodiment of the present invention;

DETAILED DESCRIPTION OF THE INVENTION

The following describes embodiments of a switching power supply according to the present invention with reference to the accompanying drawings.

Figure 1:
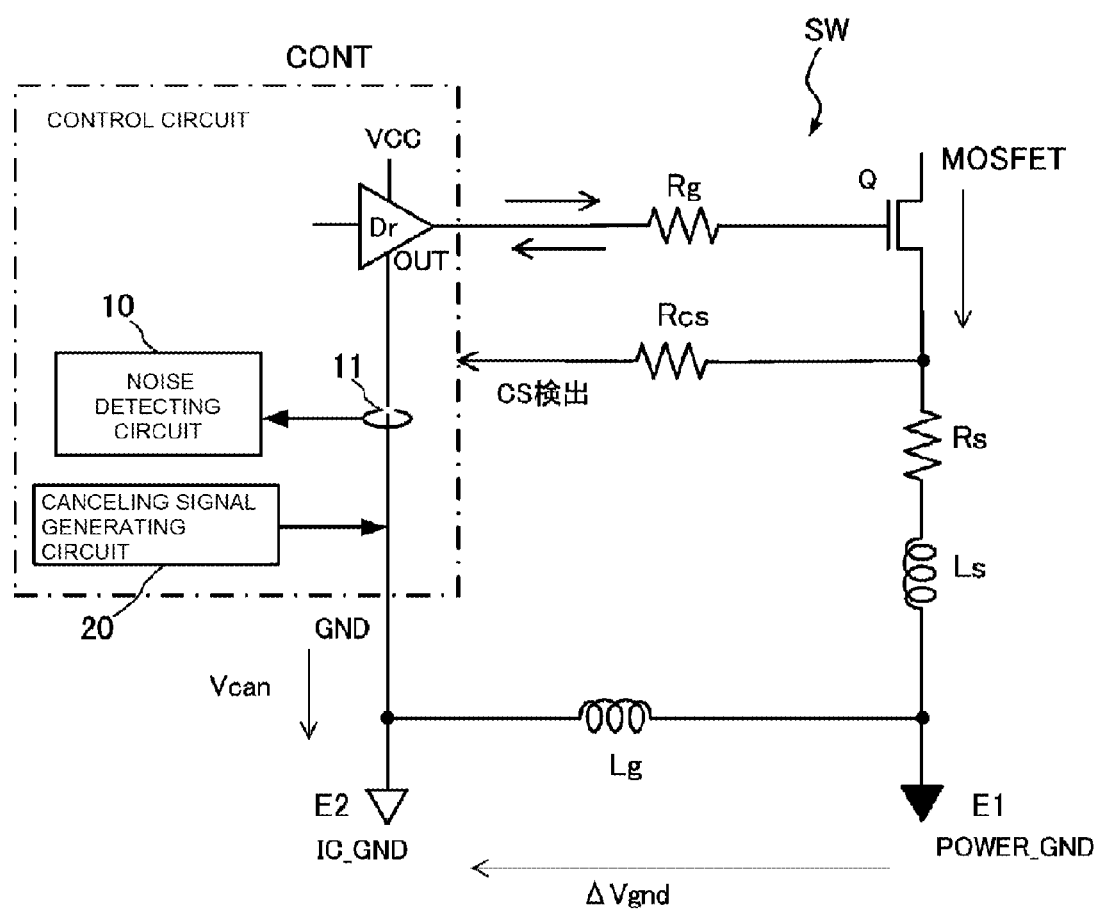
FIG. 1 shows a schematic construction of a part of a switching power supply according to an embodiment of the present invention.
Figure 5A:
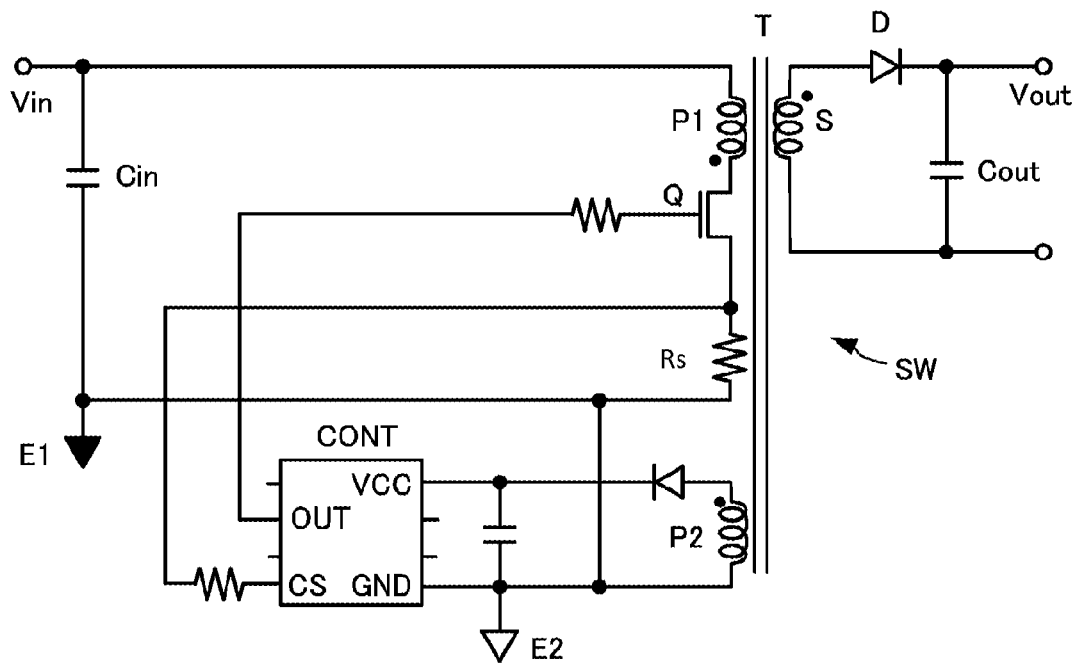
FIG. 5A shows an example of schematic construction of a part of a switching power supply that detects switching current in a positive detection mode.
Figure 5B:
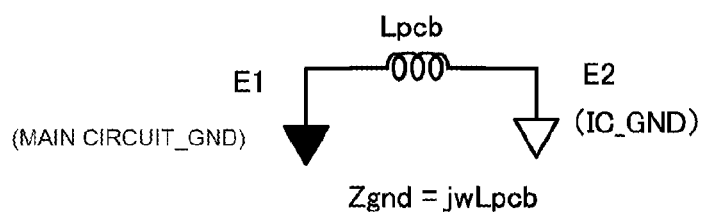
FIG. 5B shows an equivalent circuit between the ground of the main circuit and the ground of the control circuit in the switching power supply of FIG. 5A.
Figure 6A:
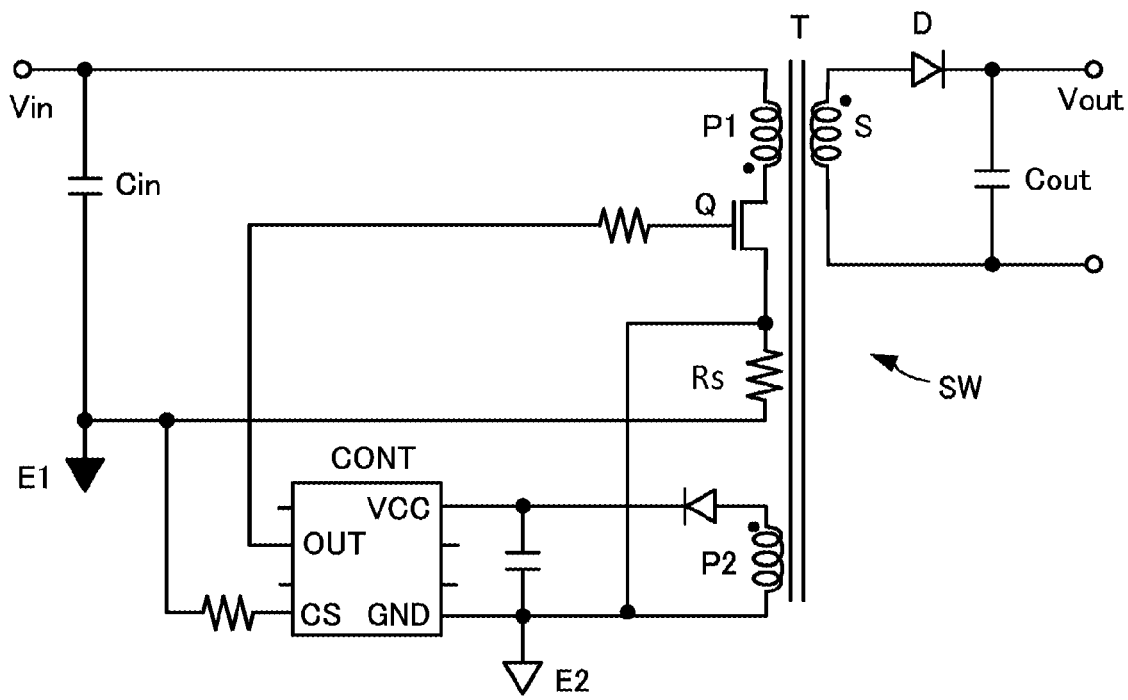
FIG. 6A shows an example of schematic construction of a part of a switching power supply that detects switching current in a negative detection mode.
Figure 6B:
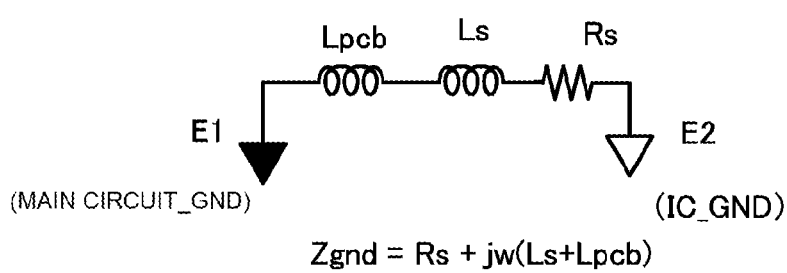
FIG. 6B shows an equivalent circuit between the ground of the main circuit and the ground of the control circuit in the switching power supply of FIG. 6A.
Figure 7A:
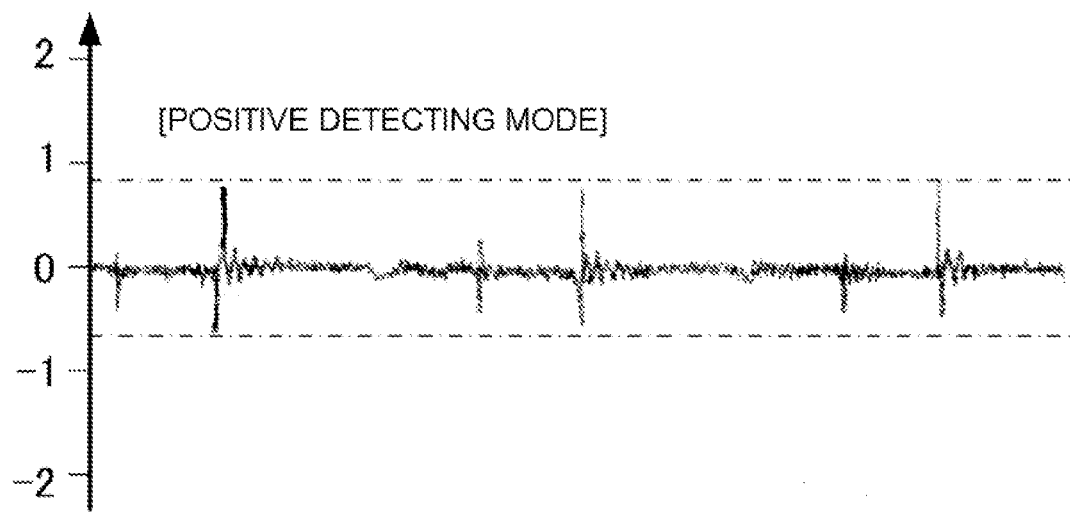
FIG. 7A shows GND bounce noise developed in a switching power supply in a positive detection mode.
Figure 7B:
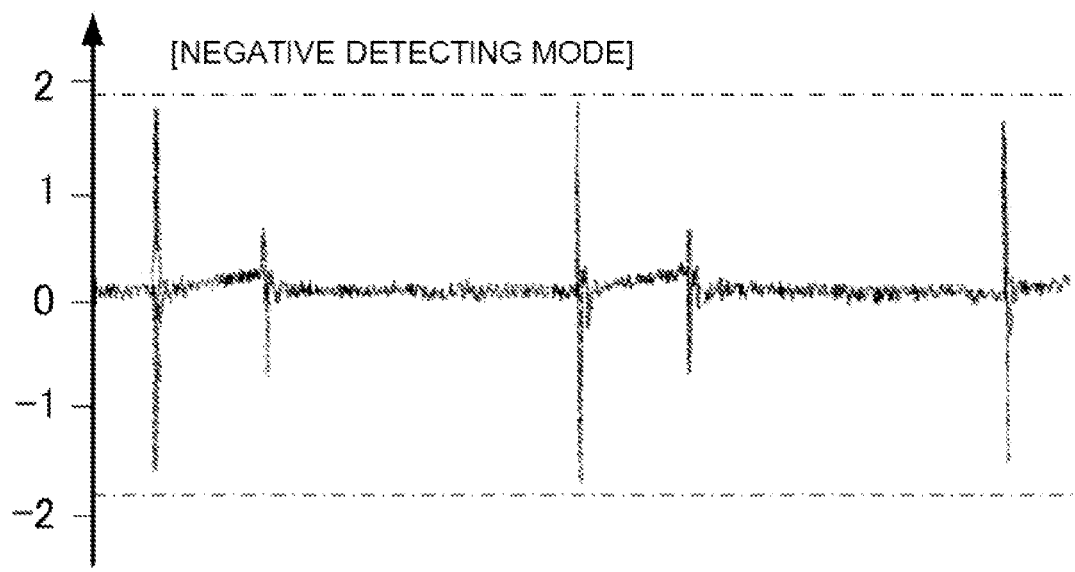
FIG. 7B shows GND bounce noise developed in a switching power supply in a negative detection mode.
Figure 8A:
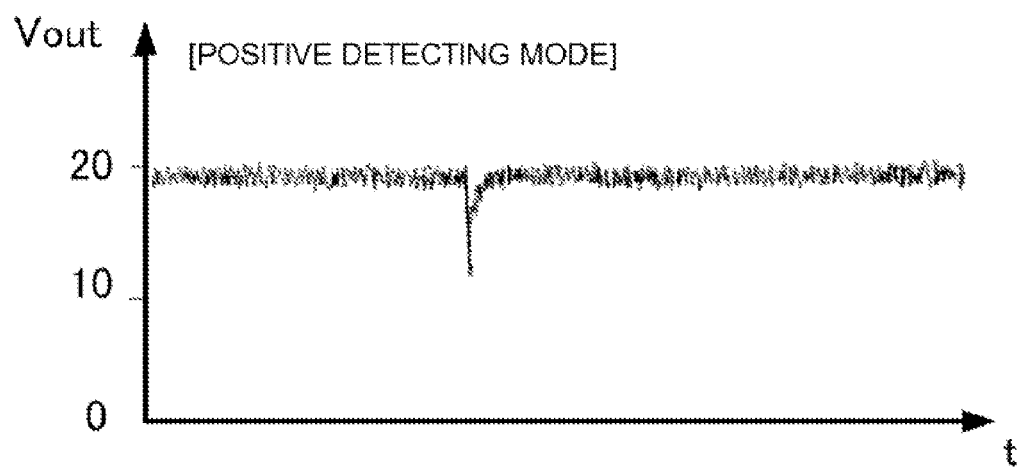
FIG. 8A shows a waveform of an output voltage Vout in a switching power supply in a positive detection mode subjected to an external noise.
Figure 8B:
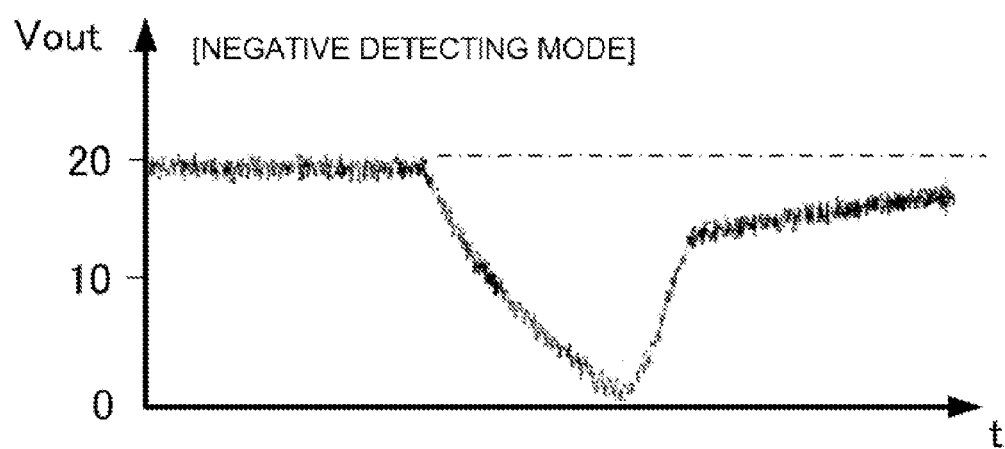
FIG. 8B shows a waveform of an output voltage Vout in a switching power supply in a negative detection mode subjected to an external noise.

FIG. 1 shows a schematic construction of a part of a switching power supply according to an embodiment of the invention. The switching power supply has an overall construction as shown in FIG. 5A or FIG. 6A. In FIG. 1, the same parts as those of the switching power supply shown in FIG. 5A or FIG. 6A are given the same symbols and repeated description therefor is omitted.

This switching power supply is characterized by a control circuit CONT, which is a control IC for controlling switching operation of the switching element, installing a noise detecting circuit 10 to detect GND bounce noise generated on the ground line of the control circuit CONT and a canceling signal generating circuit 20 to generate a canceling signal and give the signal to the ground line.

The noise detecting circuit 10 detects GND bounce noise generated accompanying the switching operation of the switching element Q from, for example, a voltage picked up with a current transformer 11 linked with the ground line of the control circuit CONT. More specifically, the noise detecting circuit 10 includes a comparator (not shown in the figure) that compares the output voltage of the current transformer 11 with a predetermined threshold level of noise detection, and a counter (not shown in the figure) that counts the number of reversal of the output voltage of the comparator.

Figure 2:
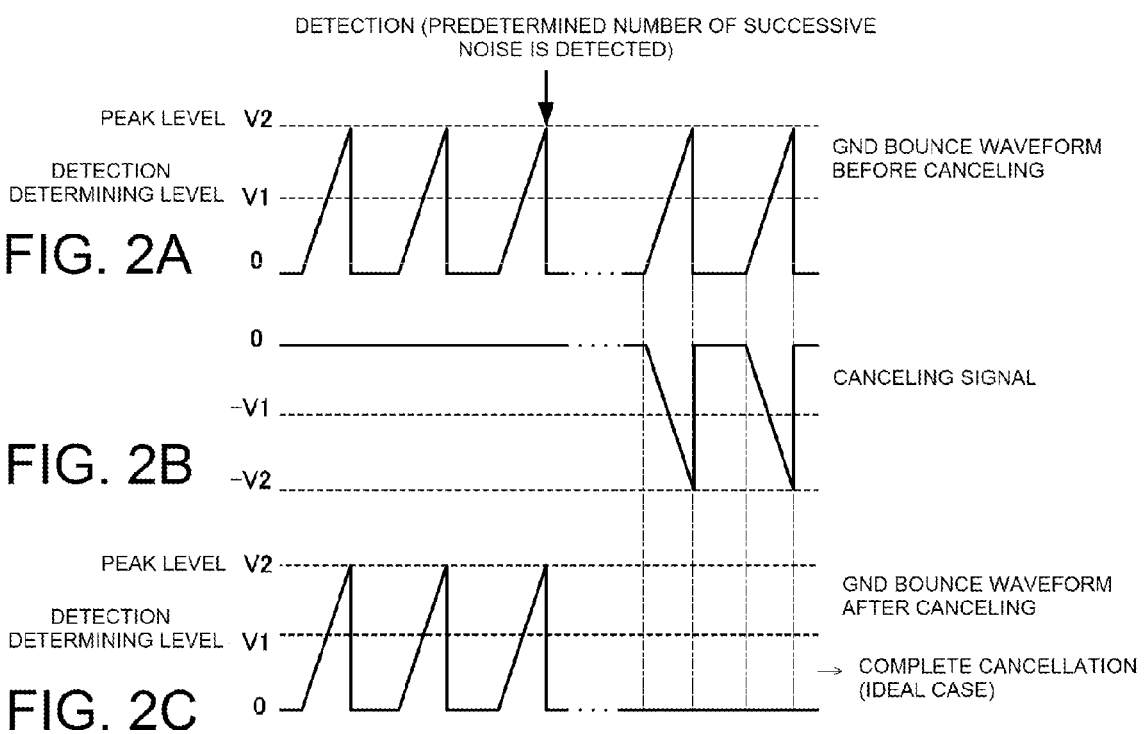
FIGS. 2A, 2B, and 2C show signal waveforms canceling operation of GND bounce noise in the switching power supply shown in FIG. 1.

The noise detecting circuit 10 determines the generation of GND bounce noise from the output of the counter in the noise detecting circuit 10 when the output voltage of the current transformer 11 exceeds the threshold level V1 for noise detection at predetermined successive times synchronously with the switching period of the switching element Q, as shown by the operation timing chart in FIG. 2A.

The canceling signal generating circuit 20 starts operation when the noise detecting circuit 10 detects the GND bounce noise. The canceling signal generating circuit 20 generates a canceling signal based on the voltage that develops across the shunt resistor Rs inserted in series with the switching element Q and is delivered to the current detecting terminal CS of the control circuit CONT through an input resistor Rcs.

The voltage developed across the shunt resistor Rs corresponds to the current flowing through the switching element Q to the ground line. The canceling signal generating circuit 20 receives an input voltage Vcs at the current detecting terminal CS synchronously with the switching period of the switching element Q and generates an output voltage Vcan that is in reversed phase with respect to the input voltage Vcs as indicated in FIG. 2B. The output voltage Vcan generated in the canceling signal generating circuit 20 is a canceling signal that has been adjusted in the output level thereof corresponding to the GND bounce noise and is in a reversed phase with respect to the GND bounce noise.

The canceling signal generating circuit 20 delivers the output voltage thereof, which is the canceling voltage Vcan, to the ground line of the control circuit CONT to cancel the GND bounce noise appeared on the ground line as shown in FIG. 2C. The ground bounce noise ΔVgnd appears, as shown in FIG. 1, at the ground point E2 of the control circuit CONT due to the impedance of the inductance component Lg of the circuit pattern between the ground point E2 of the control circuit CONT and the ground point E1 of the main body SW of the switching power supply. The GND bounce noise AVgnd is canceled by the canceling signal Vcan, which is the output voltage of the canceling signal generating circuit 20.

Figure 3:
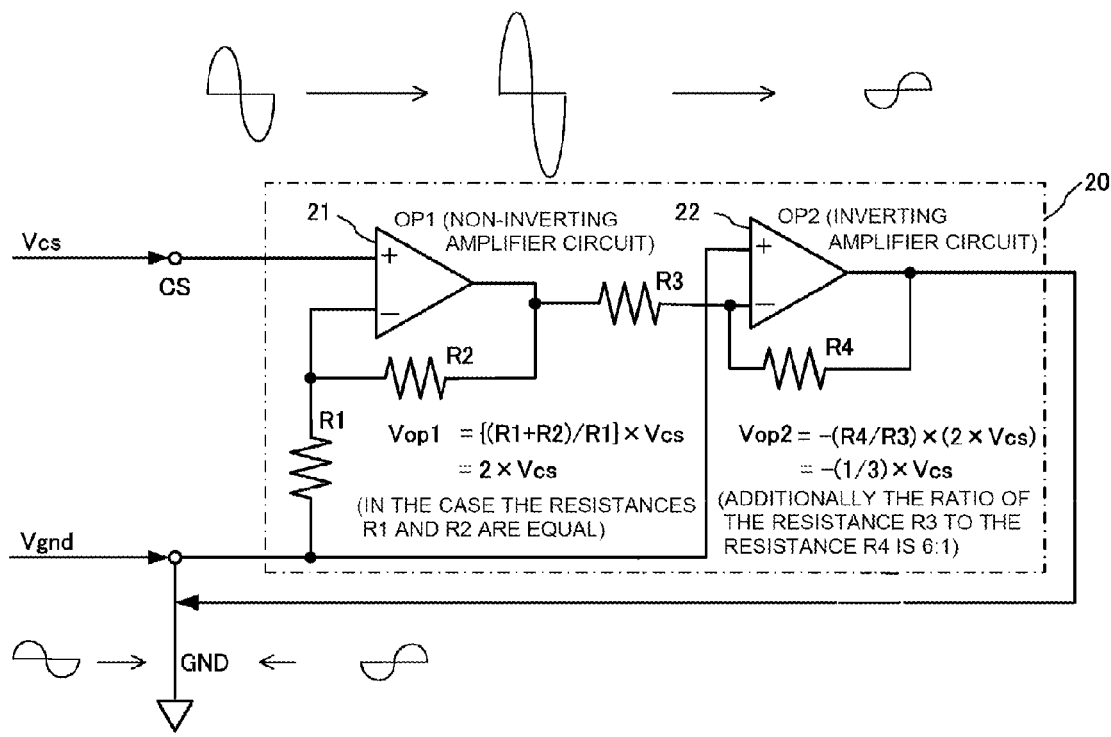
FIG. 3 shows an example of construction of the canceling signal generating circuit in the switching power supply shown in FIG. 1.

FIG. 3 shows an example of specific construction of the canceling signal generating circuit 20 that generates the canceling signal Vcan, which is the output voltage thereof, based on the input voltage Vcs received at the current detecting terminal CS. The canceling signal generating circuit 20 of FIG. 3 comprises a non-inverting amplifying circuit 21 for amplifying the input voltage Vcs and an inverting amplifying circuit 22 for level adjusting the output of the non-inverting amplifying circuit 21 to obtain the output voltage Vcan.

The non-inverting amplifying circuit 21 and the inverting amplifying circuit 22 are known circuits employing an operational amplifier. An output voltage Vop1 of the non-inverting amplifier 21 is given by the formula below.

$$Vop1=[(R1+R2)/R1]\times Vcs,$$

where R1 is an input resistance and R2 is a feedback resistance. In the specific case of R1=R2, the output voltage Vop1=2×Vcs.

The output voltage, the canceling signal Vcan, of the inverting amplifying circuit 22 is given by the following equation.

$$Vop2=-(R4/R3)\times Vop1=Vcan,$$

where R3 is an input resistance and R4 is a feedback resistance. In the specific case of R1=R2 and the ratio of the input resistance R3 to the feedback resistance R4 is 6 to 1, the output voltage Vop2=Vcan of the inverting amplifying circuit 22 reduces to $$Vop2=-(\frac{1}{3})\times Vcs.$$

An example of specific construction of the canceling signal generating circuit 20 gives a canceling signal Vcan corresponding to the GND bounce noise ΔVgnd at a level of ⅓ of the input voltage Vcs, for example, based on the actually detected value of the GND bounce noise in consideration of difference in switching current detected either in the positive detection mode or in the negative detection mode. In this special case, the resistance value R1, R2, R3, and R4 can be set at the values mentioned above.

Thus, the switching power supply comprising the noise detecting circuit 10 and the canceling signal generating circuit 20 included in the control circuit CONT cancels the GND bounce noise developed with the switching operation of the switching element Q readily and effectively. This effective cancellation of the GND bounce noise is performed as an intrinsic function provided in the control circuit CONT, which is a control IC, and thus is conducted without employing complicated constructions like those disclosed in Patent Documents 1 and 2.

Even when external noise is added, since the GND bounce noise is canceled in the control circuit CONT, malfunctions of the control circuit CONT due to the bounce caused by the external noise scarcely occur. Therefore, the control circuit CONT, a control IC, can be made small-sized and low in power consumption, with improved noise immunity or enhanced S/N ratio of the control circuit CONT, effectively avoiding any malfunction due to the GND bounce noise. That is a big advantage in practical application.

While the GND bounce noise is generally in a frequency range lower than 100 kHz, the external noise is in the range lower than 3 GHz which is substantially higher than the frequency range of the GND bounce noise. Consequently, an external filter needs to be provided as in conventional power supply systems to cope with the external noise. However, a burden on the filter is lightened in a power supply system employing the present invention because the GND bounce noise is canceled in the control circuit CONT, a control IC. Thus, a power supply system applying the invention can have a simplified construction.

While the embodiment described thus far completely cancels the GND bounce noise by generating a canceling signal in a reversed phase to the GND bounce noise, a simpler measure can be taken to reduce the level of the GND bounce noise. As shown by the waveforms in FIGS. 4A, 4B, and 4C, when the noise detecting circuit 10 has detected GND bounce noise, the canceling signal generating circuit 20 generates a canceling signal that is a pulse signal, indicated in FIG. 2B, with a pulse height at the threshold level V1 for determination of detection of the GND bounce noise in the noise detecting circuit 10.

This canceling signal, the pulse signal with a pulse height of V1, is added to the GND bounce noise to reduce the level of the GND bounce noise by the threshold level V1 as shown in FIG. 4C. Thus, the level of the GND bounce noise on the ground line of the control circuit CONT is controlled at a low level. In other words, the GND bounce noise is partly canceled to reduce the overall level thereof. The partial cancellation also improves the noise immunity or enhances the S/N ratio of the control circuit CONT, which is a practical advantage, too.

The present invention is not limited to the embodiments described thus far. A threshold level for noise detection of the GND bounce noise and a threshold value of the number of times at which the GND bounce noise exceeds the threshold level for determination of noise detection, for example, can be appropriately set corresponding to the specifications of the operation of the control circuit CONT and the switching power supply. The construction of a main body SW of the switching power supply is, of course, not limited to the circuit constructions of FIG. 5A and FIG. 6A. Moreover, methods of generating a canceling signal are not limited to those of the embodiment described thus far. The invention can be modified within the scope and spirit of the invention.

DESCRIPTION OF SYMBOLS

SW, main body of a switching power supply
Q: switching element
T: transformer
D: diode
Cout: output capacitor
CONT: control circuit (control IC)
10: noise detecting circuit
20: canceling signal generating circuit
21: non-inverting amplifier
22: inverting amplifier

What is claimed is:

1. A switching power supply comprising:
a main body of the switching power supply that performs switching operation of input voltage through switching a switching element to obtain a specified output voltage;
a control circuit that ON/OFF drives the switching element at a predetermined frequency;
a noise detecting circuit that detects GND bounce noise developed on a ground line of the control circuit accompanying the switching of the switching element; and
a canceling signal generating circuit that generates a canceling signal corresponding to the GND bounce noise and in a reversed phase with respect to the GND bounce noise and adds the canceling signal onto the ground line of the control circuit when the noise detecting circuit detects the GND bounce noise;
wherein the noise detecting circuit detects the GND bounce noise based on an output voltage of a current transformer linked with the ground line exceeding a threshold level for noise detection a predetermined number of successive times.

2. The switching power supply according to claim 1, wherein
the noise detecting circuit and the canceling signal generating circuit are installed in the control circuit.

3. The switching power supply according to claim 1, wherein
the noise detecting circuit detects the GND bounce noise based on electric potential variation on the ground line of the control circuit synchronous with the switching of the switching element.

4. The switching power supply according to claim 1, wherein
the canceling signal generating circuit generates the canceling signal based on electric current flowing through the switching element.

5. The switching power supply according to claim 1, wherein
the canceling signal generating circuit generates a canceling signal of a pulse signal with a pulse height equal to a threshold level for determining noise detection of the GND bounce noise in the noise detecting circuit.

6. An apparatus, comprising:
a noise detecting device configured to detect noise associated with a ground component of a switching device; and
a noise canceling device configured to generate a noise canceling signal to at least partly cancel noise detected by the noise detecting device;
wherein:
the noise canceling signal includes a pulse signal with a pulse height at a threshold level for determination of detection of the noise;
the noise canceling signal is configured to generate an offsetting voltage synchronously with a noise voltage corresponding to the noise;
the offsetting voltage comprises an inverse or negated voltage value with respect to the noise voltage; and
the noise canceling device is configured to apply the offsetting voltage to the ground component of the switching device.

7. The apparatus of claim 6, wherein the offsetting voltage comprises a waveform including portions each having a value that when added to a noise voltage waveform at least partly reduces the noise voltage.

* * * * *